United States Patent
Creamer et al.

(10) Patent No.: US 8,112,761 B2
(45) Date of Patent: *Feb. 7, 2012

(54) INTERFACING AN APPLICATION SERVER TO REMOTE RESOURCES USING ENTERPRISE JAVA BEANS AS INTERFACE COMPONENTS

(75) Inventors: Thomas E. Creamer, Boca Raton, FL (US); Victor S. Moore, Lake City, FL (US); Wendi L. Nusbickel, Boca Raton, FL (US); Ricardo Dos Santos, Boca Raton, FL (US); James J. Sliwa, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 607 days.

This patent is subject to a terminal disclaimer.

(21) Appl. No.: 12/200,018

(22) Filed: Aug. 28, 2008

(65) Prior Publication Data
US 2008/0312933 A1 Dec. 18, 2008

Related U.S. Application Data

(63) Continuation of application No. 10/833,566, filed on Apr. 28, 2004, now Pat. No. 7,448,041.

(51) Int. Cl.
*G06F 13/00* (2006.01)

(52) U.S. Cl. ......... 719/311; 719/330; 718/100; 718/104
(58) Field of Classification Search ............. 719/311, 719/330; 718/100, 104
See application file for complete search history.

(56) References Cited

U.S. PATENT DOCUMENTS

| | | | |
|---|---|---|---|
| 6,456,974 B1 | 9/2002 | Baker et al. | |
| 6,886,041 B2 | 4/2005 | Messinger et al. | |
| 6,961,776 B1 * | 11/2005 | Buckingham et al. | ........ 709/229 |
| 7,086,065 B1 | 8/2006 | Yeluripati et al. | |
| 2003/0036919 A1 | 2/2003 | Felt et al. | |
| 2003/0046316 A1 | 3/2003 | Gergic et al. | |
| 2003/0088421 A1 | 5/2003 | Maes et al. | |
| 2004/0123232 A1 | 6/2004 | Hodges et al. | |
| 2004/0221261 A1 | 11/2004 | Blevins | |
| 2005/0149612 A1 | 7/2005 | Messinger et al. | |
| 2005/0234779 A1 | 10/2005 | Chiu et al. | |

FOREIGN PATENT DOCUMENTS
GB 9812361.5 6/1998

* cited by examiner

*Primary Examiner* — Andy Ho
(74) *Attorney, Agent, or Firm* — Novak Druce + Quigg LLP

(57) ABSTRACT

A method for interfacing an application server with a resource can include the step of associating a plurality of Enterprise Java Beans (EJBs) to a plurality of resources, where a one-to-one correspondence exists between EJB and resource. An application server can receive an application request and can determine a resource for handling the request. An EJB associated with the determined resource can interface the application server to the determined resource. The request can be handled with the determined resource.

11 Claims, 3 Drawing Sheets

INTERFACING AN APPLICATION SERVER TO REMOTE RESOURCES USING ENTERPRISE JAVA BEANS AS INTERFACE COMPONENTS

CROSS REFERENCE TO RELATED APPLICATIONS

This application is a continuation of, and accordingly claims the benefit of, U.S. patent application Ser. No. 10/833,566, filed with the U.S. Patent and Trademark Office on Apr. 28, 2004, now U.S. Pat. No. 7,448,041.

BACKGROUND

1. Field of the Invention

The present invention relates to the field of computer software and, more particularly, to telephony application servers accessing remote resources.

2. Description of the Related Art

Speech engines can provide a multitude of different speech services, like automatic speech recognition (ASR) services, synthetic speech generation services, transcription services, language and idiom translation services, and the like. Many of these speech engines are commonly written in a low-level, compiled language, such as a C programming language, for performance reasons. Services of a speech engine can often be accessed using a provided application programming interface (API), which can also be written in a low-level compiled language. In a desktop environment, where a speech engine is typically used by a single speech application, the API serves as a simple and satisfactory interface to the speech engine.

In a distributed environment, where multiple application servers can intermittently utilize services of a speech engine, more robust interface mechanisms are needed. That is, the management of one or more speech engines in a distributed, server/middleware environment can involve complex resource management issues. A few of these issues include life cycle management, routing of requests to appropriate engines, load balancing, pooling and clustering of speech engines, remote client-server APIs, and fail-over strategies. Writing, testing, implementing, and maintaining speech engine management routines can be excessively costly.

Worse, often application server and/or speech engine interfaces and related management software can be proprietary to the vender that provides the software. Accordingly, each vender implements its own interface management routines. This is true for venders of application servers as well as venders of speech engines. Because of the different proprietary interfaces, integrating speech engines and application servers to one another can be difficult and often inefficient. Further, administrators often must have knowledge of and training using a wide gambit of different management interfaces.

What is needed is an interface technique for integrating an application server to a speech engine that standardizes and simplifies interface management functions. Better still, if the interface technique functions in a platform independent fashion, exploits infrastructure management capabilities of an application server, and can be deployed across applications written in a multitude of programming languages.

SUMMARY OF THE INVENTION

The present invention provides a method, a system, and an apparatus for interfacing an application server to a resource using dedicated ENTERPRISE JAVA BEANS (EJBs) in accordance with the inventive arrangements disclosed here. More specifically, EJBs can be established as interface components between the application server and the remotely located resources, where the application server can be a JAVA 2 ENTERPRISE EDITION (J2EE) server and the remotely located resource can be a non-J2EE resource. A one-to-one correspondence can be established between an EJB and a resource. Each resource can include a control interface that functions as an interface between the resource and the associated EJB. Communications with the control interface can utilize an application program interface (API) or other low-level construct. For example, when the resource is an Internal Business Machine (IBM®) Automatic Speech Recognition Engine, the control interface can use a Speech Manager API (SMAPI). When the resource is an IBM TTS engine, the control interface can use an Eloquence Command Interface (ECI).

Interfacing an application server to resources using EJBs results in numerous advantages over conventional interfacing approaches. Many of these advantages result from functionality included within a J2EE platform. Advantages relating to lifecycle management include the creation of EJBs on demand, discarding outdated EJBs and associated objects, and the sharing of a pool of available EJBs among several clients. Interfacing using EJBs can also permit resource pooling, such as connection pooling, pooling of EJBs, and pooling of threads. Further, EJBs offers advantages in the areas of persistence, security, transaction management, clustering, concurrency, scalability, and the like. Using an interface solution that harnesses the core function of a remote resource while leveraging the management and infrastructure capabilities of a J2EE compliant application can result in enterprise solutions that are almost turnkey in nature.

One aspect of the present invention can include a method for interfacing an application server with a resource. The method can include the step of associating a plurality of Enterprise Java Beans (EJBs) to a plurality of resources, where a one-to-one correspondence exists between EJBs and resources. An application server can receive an application request and can determine a resource for handling the request. An EJB associated with the determined resource can interface the application server to the determined resource. The request can then be handled with the determined resource.

It should be noted that the invention can be implemented as a program for controlling a computer to implement the functions described herein, or a program for enabling a computer to perform the process corresponding to the steps disclosed herein. This program may be provided by storing the program in a magnetic disk, an optical disk, a semiconductor memory, any other recording medium, or distributed via a network.

Another aspect of the present invention can include a voice server system including a componentized telephone application server, at least one speech engine, and at least one interface EJB. The componentized telephone application server can include a J2EE voice server component. The speech engines can be located local from the componentized application server and/or can be located in a location remote from the componentized application server. Each speech engine can perform at least one programmatic action for the voice server. The interface EJBs can each be configured to interface with the speech engines. Telephone application server requests can be conveyed to selected speech engines using EJBs as communication intermediaries between the server and the selected speech engines.

BRIEF DESCRIPTION OF THE DRAWINGS

There are shown in the drawings, embodiments that are presently preferred; it being understood, however, that the invention is not limited to the precise arrangements and instrumentalities shown.

DETAILED DESCRIPTION OF THE INVENTION

Figure 1:
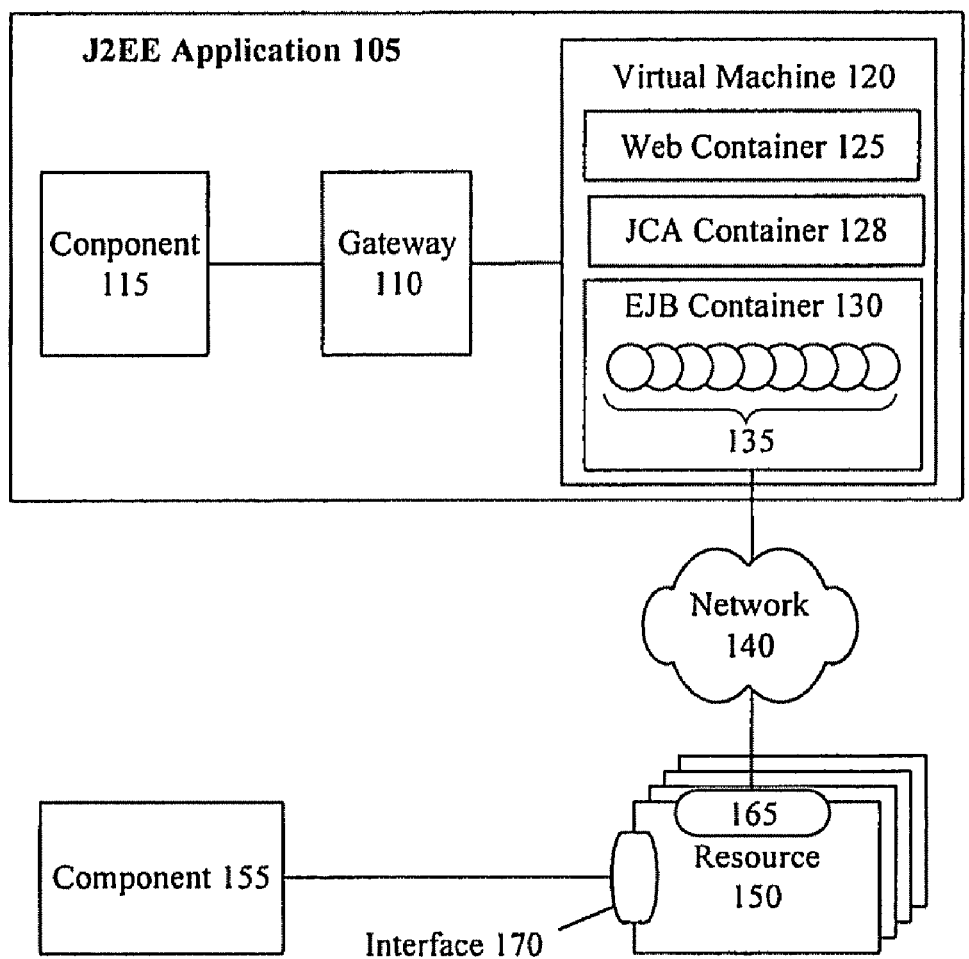
FIG. 1 is a schematic diagram illustrating a system where Enterprise Java Beans interface an application server to a resource in accordance with the inventive arrangements disclosed herein.

FIG. 1 is a schematic diagram illustrating a system 100 where ENTERPRISE JAVA BEANS (EJBs) interface an application server to a resource in accordance with the inventive arrangements disclosed herein. The system 100 can include a JAVA 2 ENTERPRISE EDITION (J2EE) application 105 connected to a resource 150 via a network 140.

The J2EE application 105 can include software representing a middleware solution. In one embodiment, the J2EE application can systematically tie together two or more disparate applications in an enterprise, one such application being the resource 150. For example, the J2EE application server 105 can include a WEBSPHERE APPLICATION SERVER (WAS) by IBM. It should be appreciated, however, that the J2EE application 105 can include any J2EE compliant application and that the invention is not limited in this regard.

In one arrangement, the J2EE application 105 can be a distributed application containing of a multitude of dispersed, yet communicatively linked components. For instance, the J2EE application 105 can include a component 115 linked to a virtual machine 120 through a gateway 110. A multitude of different communication mechanisms and protocols can be used by the component 115 to communicate with the virtual machine 120. For example, Internet Inter-ORB Protocol (IIOP), ActiveX, Remote Method Invocation (RMI), Common Object Request-Broker Architecture (CORBA), Distributed-Component Object Model (DCOM), and the like can be used to communicate between the component 115 and the virtual machine 120.

The virtual machine 120 can include a web container 125, a Java Connector Architecture (JCA) container 128, and an EJB container 130. The JCA container 128 provides a java technology solution to the problem of connectivity between many application servers and enterprise information systems (EISs). The JCA container 128 can provide a well defined interface for components local to the J2EE Application 105. Accordingly, the JCA container 128 can function as an interface between component 115 and beans within the EJB container 130.

The EJB container 130 can include a plurality of interface beans 135. In one embodiment, each interface bean 135 can be a stateless session EJB. Each interface bean 135 can be associated with a particular resource 150 so that each type of resource 150 has its own interface bean 135. Further, a one-to-one correspondence can exist between instances of interface beans 135 and processes handled by resources 150. That is, for each process executed by a resource 150, an instance of an interface bean 135 is needed. Accordingly, when N processes are being executed by a multitude of resources 150, N instances of interface beans 135 are needed.

The resource 150 represents a software application that performs one or more programmatic actions for the virtual machine 120. For example, the resource 150 can include a speech engine like an automatic speech recognition (ASR) engine, a text-to-speech (TTS) engine, and the like. Additionally, the resource 150 can be written in a non-J2EE language, such as the C programming language. It should be appreciated, however, that the invention is not limited in this regard and that the resource 150 can represent any software routine written in any language, so long as that routine exposes at least one executable method to the J2EE Application 105.

The resource 150 can include a control interface 165 and interface 170. The control interface 165 can include control code that interfaces the resource 150 to an associated interface bean 135. For example, the control interface 165 can include a low-level application program interface (API), such as an API written in the C programming language. In one embodiment, when the resource 150 is an IBM TTS engine, the control interface 165 can include the Eloquence Command Interface (ECI). In another embodiment, when the resource 150 is an IBM ASR engine, the control interface 165 can include a Speech Manager API (SMAPI).

Communications between the control interface 165 and an associated interface bean 135 across the network 140 can occur using standard communication mechanisms, such as Transmission Control Protocol/Internet Protocol (TCP/IP), Java Native Interface (JNI), media resource control protocol (MRCP), and the like.

The interface 170 can be used as a gateway between resource 150 and a remote component 155 not directly linked to the J2EE application 105. The remote component can represent any software application, library, service, data store, and/or routine remotely located from the resource 150. In one embodiment, a task performed by the resource 150 for the J2EE application 105 can trigger a programmatic action within the component 155. For example, the component 155 can stream audio input to the resource 150 responsive to an input request. In another embodiment, the component 155 can be a remote resource used by the resource 150. For example, the component 155 can provide a source for media output so that the resource 150 can stream media output information to this media output source.

Figure 2:
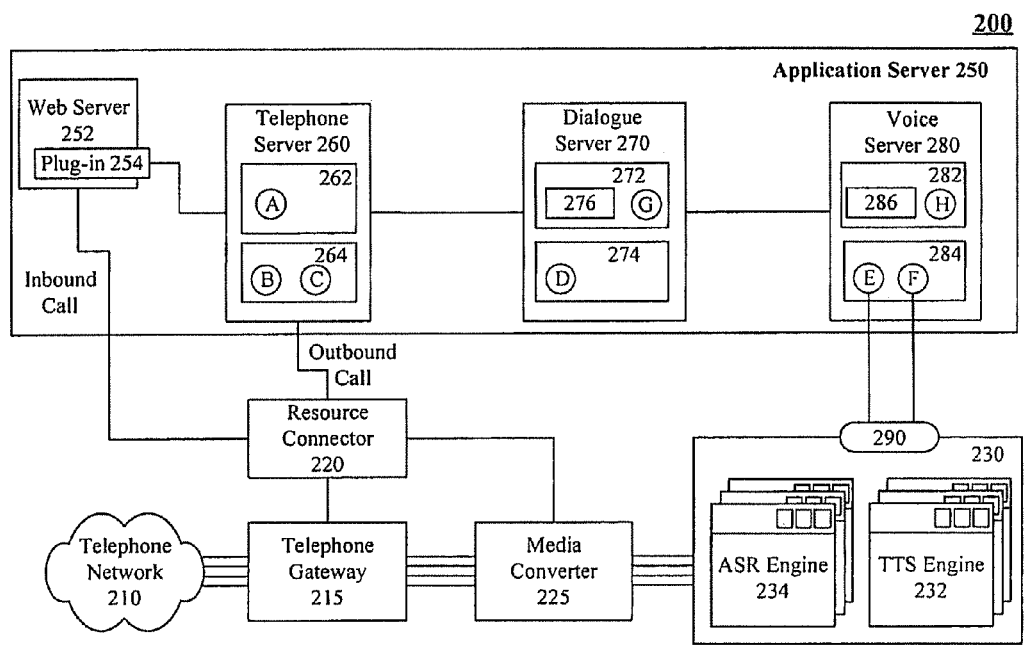
FIG. 2 is a schematic diagram illustrating a system including a telephony application server linked to speech engines via at least one interface bean in accordance with the inventive arrangements disclosed herein.

FIG. 2 is a schematic diagram illustrating a system 200 including a telephony application server linked to speech engines via at least one interface bean in accordance with the inventive arrangements disclosed herein. The system 200 can include a telephone gateway 215, one or more speech engines 230, and a telephony application server 250.

The telephone gateway 215 can include hardware and/or software that translates protocols and/or routes calls between a telephone network 210, such as a Public Switched Telephone Network (PSTN), and the application server 250. The telephone gateway 215 can route calls using packet-switched as well as circuit switched technologies. Further, the telephone gateway 215 can contain format converting components, data verification components, and the like. For example, the telephone gateway 215 can include a CISCO 2600 series router from Cisco Systems, Inc. of San Jose, Calif., a Cisco, a CISCO 5300 series gateway, a Digital Trunk eXtended Adapter (DTXA), an INTEL DIALOGIC (R) Adaptor from Intel Corporation of Santa Clara, Calif., and the like.

The speech engines 230 can include one or more automatic speech recognition engines 234, one or more text to speech engines 232, and other media resources. Particular ones of the speech engines 230 can include one or more application program interfaces (APIs) for facilitating communications between the speech engine 230 and external components. For example, in one embodiment, the ASR engine 234 can include an IBM ASR engine with an API such as SMAPI. Selective ones of the speech engines 230 can include a control interface 290 for interfacing with the application server 250.

The application server 250 can include an engine that functions as a reliable foundation for handling high volume secure transactions and Web services. In one embodiment, the application server 250 can be a WAS.

The application server 250 can also include a multitude of component servers, such as telephone server 260, dialogue server 270, and voice server 280, communicatively linked via one or more Web servers 252. Each Web server 252 can include one or more plug-ins 254, where each plug-in 254 can include routines for conveying data to particular component servers within the application server 250. Each of the component servers of the application server 250 can be components implemented within a Virtual Machine, such as virtual machines adhering to the J2EE specification or other similar and/or derivative specification.

The telephone server 260 can control the setup, monitoring, and tear down of phone calls. In one arrangement, telephone server 260 can include a web container 262 and an EJB container 264. Moreover, the telephone server 260 can include a call control servlet (servlet A), a call control EJB (Bean B), and a call control interpreter EJB (Bean C). The call control interpreter can interpret any call control markup, such as call control ML (Mark-up Language), call control eXtensible Mark-up Language (CCXML), computer supported telephony application eXtensible Mark-up Language (CSTAXML), and the like.

The dialogue server 270 can manage tasks relating to call dialogue for the application server 250. In one arrangement, the dialogue server 270 can include web container 272 and EJB container 274. Moreover, the dialogue server 270 can include a voice markup interpreter EJB (Bean D), which can interpret a markup, such as VoiceXML. The dialogue server 270 can also include a JCA container (not shown) that can function as an interface for the dialogue server 270.

The voice server 280 can handle one or more speech services for the application server 250. In one arrangement, the voice server 280 can include web container 282 and EJB container 284. Moreover, the voice server 280 can include a multitude of interface beans for interfacing with the speech engines 230. Each different type of speech engine 230 can be associated with a different type of interface bean. For example, an ASR interface bean (Bean E) can communicate with the ASR Engine 235. In another example, a text-to-speech interface bean (Bean F) can interface with TTS engine 232.

It should be appreciated that the telephone server 260, the dialogue server 270, and the voice server 280 can be arranged in a multitude of fashions and that the invention is not to be limited to the illustrative arrangement presented herein.

The system 200 can also include a media converter 225 and a resource connector 220. The media converter 225 can be a communication intermediary for streaming speech data configured to resolve protocol issues between the telephone gateway 215 and speech engines 230. Audio data can be streamed bi-directionally between the telephone gateway 215 and the speech engines 230 as appropriate.

The resource connector 220 can be a communication intermediary between the telephone gateway 215 and the application server 250 and/or media converter 225 that allocates resources for calls. In one embodiment, the resource connector 220 can normalize a telephony request into a request that is acceptable by the application server 250, thereby providing a generic means for the telephone gateway 215 to interface with the application server 250. For example, if the application server 250 communicates using HyperText Transfer Protocol (HTTP) messages, the resource connector 220 can convert a telephony request into an appropriate HTTP message. In another example, if the application server 250 utilizes a Session Initiation Protocol (SIP), the resource connector 220 can convert a telephony request into an appropriate SIP message.

In operation, a user can initiate a telephone call. The call can be conveyed through a telephone network 210 and can be received by the telephone gateway 215. The telephone gateway 215 can convey call information to the resource connector 220. The resource connector 220 can initialize the media converter 225, which can establish one or more media ports that can be used for the call. Identifiers, which can be Uniform Resource Identifiers (URI), associated with the reserved media ports can be conveyed to the resource connector 220. The resource connector 220 can convey call identifying information and media port identification information to the application server 250. Speech services can be triggered within the application server 250 as appropriate. Speech services can require one or more speech engines 230 to perform one or more tasks, where a task is a response to a speech request. The type (ASR or TTS) of needed speech engine 230 can be determined. Then, a determination can be made that the needed type of speech engine is associated with interface bean E. Notably, a one-to-one correspondence can exist between instances of interface beans and tasks handed by speech engines 230, each speech engine 230 interfacing with the application server 250 via the bean instance.

The speech request can be conveyed to an interface bean E. If no instance of the bean E is available, a new instance can be created. The create instance method can trigger the initialization of a control interface 290 associated with bean E. Initialization of the control interface 290 can include passing establishment parameters from bean E to the control interface 290. Once the control interface 290 is initialized, the request can be conveyed to the speech engine 230 associated with bean E.

In one embodiment, the request sent to the speech engine 230 can require a media channel to be established between the speech engine 230 and the media converter 225. In such an embodiment, the request conveyed to the speech engine can include identifier(s) for one or more of the ports established by the media converter upon receiving the call. The speech engine 230 can establish a connection with the media converter 225 via the identified port. Thereafter, audio signals can be conveyed along this connection without being routed through the application server 250 that initiated the request. After the speech engine 230 has executed the task, a response message can be conveyed back to bean E from the speech engine 230. The response message can indicate the results of the request. Bean E can then convey the results to the appropriate components within the application server 250 so that further actions can be taken as appropriate.

It should be appreciated, that FIG. 2 is just one illustrative embodiment in which the interface beans can be used. The subject matter disclosed herein can be utilized in conjunction with any system where a J2EE application interfaces with a remote resource. Accordingly, the example of FIG. 2 should not be construed as a limitation of the present invention.

It should also be appreciated that the arrangements shown in FIG. 2 are for illustrative purposes only and that the invention is not limited in this regard. The functionality attributable to the components can be combined or separated in different manners than those illustrated herein. Further, the components shown herein can reside within a different computing spaces than those illustrated in FIG. 2. For example, the media converter 225, if written in Java, can reside within the application server 250. In such an example, a specific location in which to dispose the media converter 225 can be within a JCA container (not shown) of the voice server 280.

Figure 3:
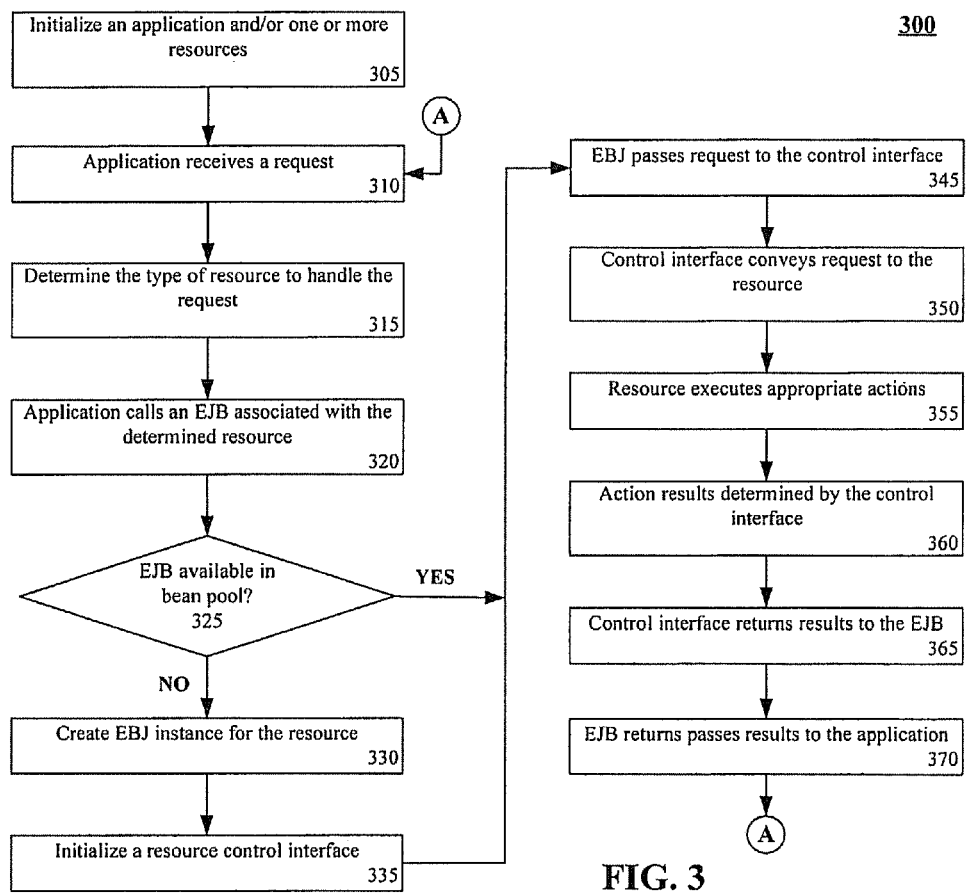
FIG. 3 is a flow chart illustrating a method for integrating a J2EE application with a resource in accordance with the inventive arrangements disclosed herein.

FIG. 3 is a flow chart illustrating a method 300 for integrating a J2EE application with a resource in accordance with the inventive arrangements disclosed herein. The method can be performed in the context of a system where resources remote from an application are triggered by the application. The triggering can occur even though the remote resources can be written in a language that is not J2EE compliant. For example, the J2EE application can include a voice server and the remote resource can be a speech engine written in a C programming language or other language not inherently compliant with the J2EE specification.

The method 300 can begin in step 305 by initializing the application and/or the remote resources. Application initialization can include instantiating one or more EJBs, such as stateless session EJBs that interface with the remote resources. Notably, a remote resource associated with an instance of an EJB can be initialized at this step, providing a one-to-one correspondence exists between each EJB instance and each process executed within a remote resource. In step 310, the application can receive a request. For example, when the application is a voice server, the request can be a request for speech processing. In step 315, the application can determine a type of resource required to handle the request. For example, when a request is for a speech recognition task, an ASR resource can be selected to handle the task. In another example, when the request is for a text-to-speech conversion task, a TTS resource can be selected. It should be noted that the application is not limited to a voice server application and that the resource is not limited to a speech engine. Indeed, method 300 can be used by any J2EE compliant application to connect to any remote resource.

In step 320, the application can call an EJB associated with the determined resource. In step 325, a determination can be made as to whether an instance of an EJB of the appropriate type is available within the EJB bean pool. If no suitable bean is available, the method can proceed to step 330, where an EJB instance can be created for interfacing with the resource. In step 335, a control interface can be initialized for the resource. During initialization of the control interface, parameters can be passed to the control interface by the associated EJB instance. In one embodiment an ejbCreate( ) method can launch the control interface to the resource. Once step 335 has completed, the method can proceed from step 335 to step 345. If a bean instance is available in step 325, the method can proceed from step 325 to step 345.

In step 345, the EJB can pass the request to the control interface. In step 350, the control interface can convey the request to the resource. In step 355, the resource can execute appropriate actions responsive to the receipt of the request. In step 360, the control interface can receive the results of the programmatic action. In step 365, the control interface can return the results to the EJB. In step 370, the EJB can convey the request results to the application. In one embodiment, once the task is completed, task specific variables within the EJB can be cleared and the EJB can be placed within a pool of available EJBs. The method can loop from step 370 to step 310, where additional requests can be received by the application, which the application can process in turn.

The present invention can be realized in hardware, software, or a combination of hardware and software. The present invention can be realized in a centralized fashion in one computer system or in a distributed fashion where different elements are spread across several interconnected computer systems. Any kind of computer system or other apparatus adapted for carrying out the methods described herein is suited. A typical combination of hardware and software can be a general-purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A voice serving system comprising:
   a memory storing a componentized telephone application server including a J2EE voice server component; and
   at least one speech engine located remotely from said componentized telephone application server, said at least one speech engine performing a plurality of programmatic actions for said componentized telephone application server,
   wherein said componentized telephone application server comprises at least one interface bean container for storing a plurality of interface beans associated with said programmatic actions, where a one-to-one correspondence exists between each of said interface beans and each of said programmatic actions, wherein each interface bean is configured to interface said componentized telephone application server with said at least one speech engine, and wherein a request from said componentized telephone application server to perform a programmatic action of said plurality of programmatic actions is conveyed to said at least one speech engine using an interface bean of said plurality of interface beans associated with said programmatic action as a communication intermediary for said componentized telephone application server.

2. The system of claim 1, wherein said at least one speech engine comprising a control interface configured as a gateway between said interface beans and said speech engine.

3. The system of claim 2, further comprising:
   a media converter configured as a communication intermediary between a telephone gateway and said speech engine for purposes of conveying audio signals relating to a telephone call, said media converter establishing at least one audio port, wherein an identifier for said audio port is conveyed from said media converter to said telephone application server and conveyed from said telephone application server to said speech engine using one of said interface beans, wherein said speech engine uses said identifier to connect to said audio port.

4. A computer-readable storage having stored thereon, a computer program having a plurality of code sections, said code sections executable by a computer for causing the computer to perform the steps of:

associating a plurality of Enterprise Java Beans (EJBs) to a plurality of speech processes handled by plurality of speech engine resources, where a one-to-one correspondence exists between each of said EJBs and each of said speech processes;

receiving an application request at an application server, said request comprising at least one speech-related task;

determining a speech process of said plurality of speech processes required for handling said task;

selecting an EJB of said plurality of EJBs associated with said required speech process; and handling said task with a speech engine resource of said plurality of speech engine resources associated with said required speech process using said selected EJB as an interface for said application server.

5. The computer-readable storage of claim 4, wherein said EJBs are stateless session EJBs.

6. The computer-readable storage of claim 5, further comprising code sections for the steps of:

after said task has been handled, clearing request specific data from said selected EJB; and adding the cleared EJB to an EJB pool so that said cleared EJB is made available for other requests.

7. The computer-readable storage of claim 4, wherein said speech engine resource includes a control interface, said control interface functioning as a communication intermediary between said associated EJB and said speech engine resource.

8. The computer-readable storage of claim 7, said control interface interfacing with the speech engine resource using an application program interface.

9. The computer-readable storage of claim 4, further comprising code sections for the step of:

conveying information identifying an audio port for said task between said associated EJB and said speech engine resource; and establishing a communication link between said speech engine resource and said audio port, wherein audio signals associated with said task are conveyed across said communication link.

10. The computer-readable storage of claim 4, wherein said application server is a Java 2 Enterprise Edition (J2EE) application, and wherein said speech engine resource is not a J2EE resource.

11. The computer-readable storage of claim 4, wherein said application server is a voice server.

\* \* \* \* \*